United States Patent [19]
Mendelson et al.

[11] Patent Number: 5,754,783
[45] Date of Patent: May 19, 1998

[54] APPARATUS AND METHOD FOR INTERLEAVING TIMED PROGRAM DATA WITH SECONDARY DATA

[75] Inventors: Jeffrey B. Mendelson, Shrewsbury; Matthew S. Goldman, Marlborough; David E. Morris, Lexington, all of Mass.

[73] Assignee: Digital Equipment Corporation, Maynard, Mass.

[21] Appl. No.: 595,085

[22] Filed: Feb. 1, 1996

[51] Int. Cl.$^6$ .................................................. G06F 17/00
[52] U.S. Cl. ............................................. 395/200.47
[58] Field of Search .................... 364/514 A, 514 R; 348/17; 395/200.13, 200.47, 200.49, 200.76

[56] References Cited

U.S. PATENT DOCUMENTS

| | | | |
|---|---|---|---|
| 553,005 | 9/1896 | Voeten et al. | 364/514 R |
| 5,229,993 | 7/1993 | Foudriat et al. | 370/85.3 |
| 5,528,513 | 6/1996 | Vaitzblit et al. | 364/514 A |
| 5,598,352 | 1/1997 | Rosenau et al. | 364/514 A |
| 5,606,362 | 2/1997 | Lee | 348/17 |

OTHER PUBLICATIONS

"Final Test for ISO/IEC DIS 13818-1: Information Technology—Generic Coding of Moving Pictures and Associated Audio Information: Systems Attachment: Explanatory Report [JTC 1/SC 29/WG 11 N 721]" (Information Processing Society of Japan/Information Technology Standards Commission of Japan [A Standards Organization Accredited by JISC]), Date: Jun. 13,1994.

*Primary Examiner*—Ellis B. Ramirez
*Attorney, Agent, or Firm*—Dirk Brinkman; Alfred A. Stadnicki

[57] ABSTRACT

In a video server a transport stream is generated. The transport stream is to be transported over a circuit of a network signalling at a constant bit rate. During generation, timed program content is encoded as a variable bit rate stream. The variable bit rate stream is transported over a constant bit rate circuit of a network. While transporting the variable bit rate stream, an accumulated difference between the number of bits transported in the variable bit rate stream and the number of bits required for the constant bit rate circuit is measured periodically. In response to the measured difference, a secondary untimed content is supplied to the constant bit rate circuit at a rate which minimizes the accumulated difference, and where the secondary content is evenly distributed over the transport stream.

13 Claims, 7 Drawing Sheets

APPARATUS AND METHOD FOR INTERLEAVING TIMED PROGRAM DATA WITH SECONDARY DATA

FIELD OF THE INVENTION

This invention relates generally to transporting video-on-demand programs, and more particularly to transporting variable bit rate or constant bit rate program transport streams including time-stamped content.

BACKGROUND OF THE INVENTION

In a video-on-demand system, programs can include primary timed, and secondary untimed digitized content, collectively "data." Timed content can include games, movies, sporting vents, concerts, advertising, music, etc. With timed content, there is a temporal relationship among the various frames which comprise the program. Typically, timed content is supplied as video and audio signals. The timed content may include related timed data, such as real time graphics, for example, closed-captions. The signals representing the timed content can be recorded on magnetic or optical media, for example, VHS tapes, for distribution.

In untimed content, there is no temporal relationship among frames of data. Untimed content can include video text, graphic images, or other private data, for example, files or databases. Typically, untimed content is digitally generated by a processor.

A video server can be used to store and format content of programs into a transport stream. The transport stream can be composed of multiple elementary streams. Each elementary stream can include timed, e.g., video or audio components, or untimed content. The transport stream can be transmitted to customer premises equipment via a communications network as a sequence of digitally encoded bits. The customer premises equipment can distinguish the elementary streams and reconstruct the program.

Formatting a program into a transport stream for delivery in real time can take a substantial amount of time and processing power. In many cases, other than for live programs, it is advantageous to format the program beforehand, then delivery of the transport stream can proceed immediately. This makes sense, particularly if the program is going to be viewed a multiple number of times. Then, the formatted program can be stored on mass storage devices, such as disks, and repeatedly played.

Typically, the video server transports encoded and compressed data in order to minimize network bandwidth requirements. Encoding and compressing can reduce transport stream bandwidth requirements by a factor exceeding two-hundred. For example, digitized audio and video components of a movie may require a continuous communications bandwidth of 230 Megabits per second (Mbps) to realize consumable quality. With encoding and compressing, the bandwidth required can be reduced down to the 1–2 Mbps range without substantially impacting the quality of the content for the purpose of entertainment. After compression, a typical two hour movie can be stored in less than one Gigabyte (GB) of storage. Of course, higher bandwidths, e.g., 8–15 Mbps, and more storage may be required in professional or studio quality applications.

According to one encoding and compressing technique, for example, the Moving Pictures Experts Group (MPEG) standard, see "MPEG: A Video Compression Standard for Multimedia Applications," Didier LeGall, Communications of the ACM, Vol. 34, No 4, April 1991, spatial and temporal compensation are used to compress the programs. For transport, the MPEG standard specifies a system layer wherein the transport stream is partitioned into fixed size transport stream packets. The MPEG standard requires that each transport stream packet (TSP) communicates exactly 188 bytes, each byte composed of eight bits of data.

If the transport stream is transmitted over an asynchronous transfer mode (ATM) network, the packets are further formatted into 53 byte ATM cells. ATM cells are grouped into protocol data units (PDUs) for transport to customer premises equipment. Typically, an 8 cell PDU can be used to format two TSPs using the standard ATM Adaptation Layer 5. The customer premises equipment sequentially accesses the packets of the transport stream to decode, decompress, and reconstruct the program for replay on an audiovisual device, such as a television or PC.

Due to the spatial and temporal compensation in compression, the number of bits representing timed content in the transport stream can vary per unit of program time. It is important that the relative real time relationship of the encoded signals be preserved while transporting the bits of the program. Viewers of programs are able to discern subtle temporal shifts in the program. Should the actions slow down, or the pitch decrease, the quality of the program is degraded.

In an MPEG transport stream, the real time of timed content is maintained by imbedding time stamps, called program clock references (PCRs). The PCRs are added during encoding. During decoding, the time stamps are used to reconstruct the program at a rate in accordance with the real time of the original program, regardless of the bit rate used to transport the stream. In order to maintain an accurate real time of the program, the PCR values are added to the transport stream at program time intervals not to exceed one tenth of a second. Effectively, the PCRs periodically time-stamp the transport stream with the program's real time. Thus, the customer premises equipment can accurately reconstruct the program signals for play on audiovisual devices.

It should be noted that there may be discontinuities in the PCR values when programs are multiplexed or spliced with other programs. For example, if a base movie program is spliced with advertisements or other filler programs, the program time of the movie is temporarily suspended until the filler completes. The program time of the filler is maintained with reference to a different real time than the base program. The program time of the movie can be resumed at the end of the filler. According to the MPEG standard, these discontinuities can be indicated by a discontinuity indicator field in the transport stream packets.

In order to maintain the quality of timed content, care must be taken to transport streams including timed content at a rate which remains relatively constant with respect to the program's real time. If the timed content is delivered too slowly, the program falls behind. This would be perceived as substantial deterioration of the program. If the timed content is delivered too quickly, buffers in the customer premises equipment used to store the transport stream during decoding would overflow, and portions of the program could be lost.

The situation where there is gross temporal displacement of the program is called wander. The situation where there are localized temporal displacements is called jitter. To minimize wander and jitter, the video server generally transmits the transport stream using a constant bit rate (CBR) network. Then the program can be delivered while preserving the relative real time relationship of the timed content.

As stated above, content is inherently compressed and encoded at a variable bit rate (VBR) due to varying compression efficiency. For example, high VBR encoding may be required for video frame sequences which contain a lot of motion or action, whereas video frame sequences with little motion may require low VBR encoding. Encoded programs, e.g., transport streams, typically include both high and low VBR encodings.

Traditionally, a process known as padding has been used to transform the VBR encodings of the program to a CBR transport stream. Padding adds extra null or stuffing bits into the program bit stream for portions of the program which would otherwise use less than the assigned network bandwidth. For example, if a one second portion of a program, perhaps containing a static or slow motion image sequence, is encoded and compressed into a VBR transport stream which would only take 0.9 seconds to transport at the assigned network bandwidth, the VBR transport stream is padded with 0.1 seconds of null or stuffing bits. Thus, the program is delivered at the correct CBR.

In a traditional pre-formatted CBR transport stream, the amount of storage media required for padding can be very large. Analysis of stored CBR transport streams has shown that padding can consume 10% to 30% of the total storage requirements.

It is desired to reduce the storage requirements for programs formatted as a constant bit rate transport stream. Furthermore, it is desired to fully utilize the bandwidth of circuits of a network provided to communicate constant bit rate transport streams.

SUMMARY OF THE INVENTION

Proposed is a method and apparatus for generating a transport stream to be transported over a constant bit rate circuit of a network. The transport stream is intended to deliver video programs and other content from a video server to customer premises equipment for viewing.

According to one aspect of the invention, timed content of a program is encoded as a variable bit rate stream. The variable bit rate stream is presented to the network for transport over the constant bit rate circuit. In another aspect of the invention, while transporting the variable bit rate stream, an accumulated difference between the number of bits actually transported in the variable bit rate stream and the number of bits required for the constant bit rate circuit is measured periodically. In response, secondary content is supplied to the constant bit rate circuit at a rate which minimizes the measured difference. As an advantage of the invention the secondary content is linearly dispersed among the primary content.

The secondary content can be padding, or as an advantage of the invention, the secondary content can be other program content. In addition, the constant bit rate can be increased to allow additional secondary content to be transported.

Accordingly, as an advantage of the invention, server storage and bus activity can be reduced by manipulating a smaller size variable bit rate transport stream. In addition, the variable bit rate transport stream can be transported while preserving the real time relationship of the encoded program signals. Furthermore, the invention allows secondary content to be linearly interleaved with primary content of the transport stream in order to better utilize available network bandwidth.

DETAILED DESCRIPTION OF A PREFERRED EMBODIMENT

Figure 1:
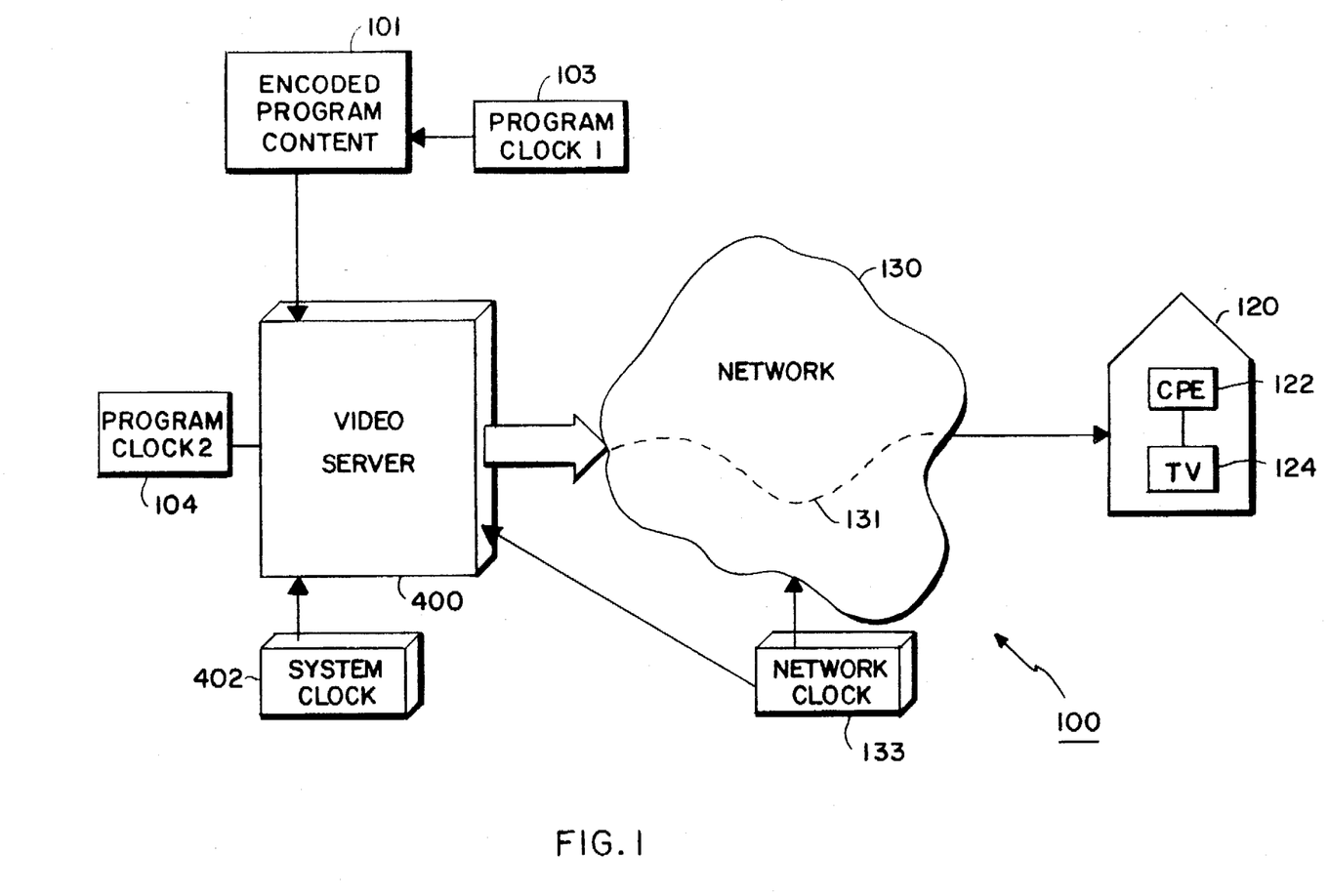
FIG. 1 is an arrangement of a video-on-demand system including a video server according to the invention.

FIG. 1 shows an arrangement 100 for delivering programs from a video server 400 to customer premises 120 via a network 130. Programs can include, for example, encoded content 101. The content 101 can include timed content and untimed content.

The video server 400 can be one or more computer systems equipped with processors, memories, busses, and communications interfaces, described in greater detail below. Operation of the server 400 is typically synchronized to a system clock 402.

The network 130 can be a public switched network, a private cable network, satellite links, and the like. In a preferred embodiment of the invention, the network 130 uses asynchronous transfer mode (ATM) protocols. The network 130 can include circuits 131. The circuits 131 can be physical or virtual. In the case of virtual circuits, the physical routing of signals varies in response to network dynamics. A network clock 133 is used to synchronize transport bit rates on the network 130.

The customer premises 120 can be located over a wide geographic area served by the network 130. The premises 120 can include customer premises equipment (CPE) 122, and an audiovisual device 124. The CPE 122, commonly known as the set-top box, can include digital processors and memory buffers, and means for converting digital signals to video signals. The viewing device 124 can be a TV, digital or analog, or a computer system capable of displaying program content.

Figure 2:
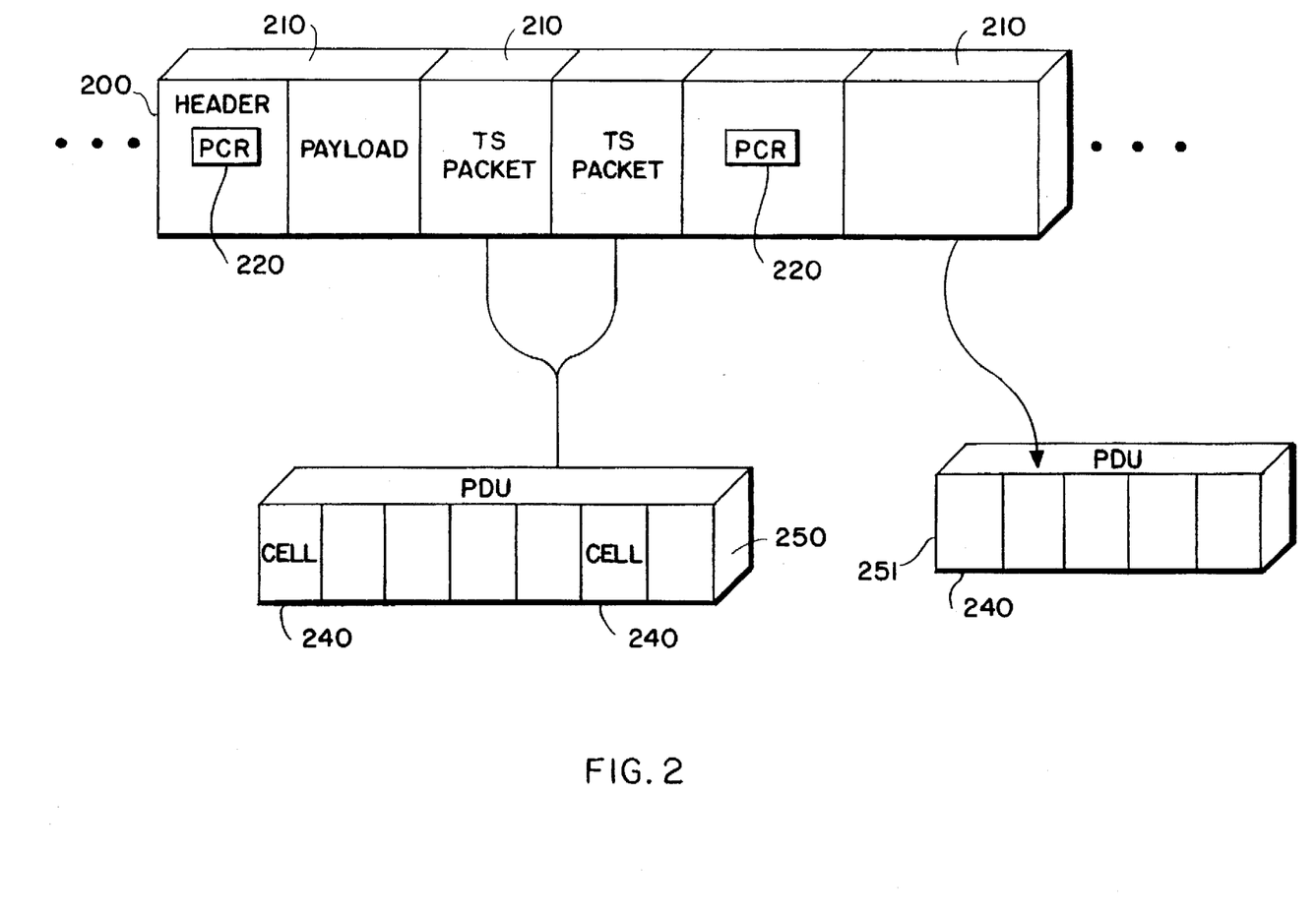
FIG. 2 is block diagrams of a portion of a transport stream including timed program content.

Now with reference to FIG. 2, the format of a transport stream 200 to be delivered over network 130 is described in greater detail. According to the MPEG standard referenced above, the transport stream 200 is organized into a plurality of 188 byte transport stream packets (TSP) 210. Each TSP 210 includes, for example, a 4 byte header and 184 bytes of program data (payload).

A transport stream can include one or more separately identified elementary streams. For example, all packets carrying video content of a primary program comprise one separately identified elementary stream. The associated audio content would be carried in packets of another elementary stream. Timed ancillary data, such as closed captioning information, can be transported as a third elementary stream. Secondary untimed content can be formatted into a fourth elementary stream. The elementary streams, in combination, comprise the transport stream.

The real time of timed content can be expressed as embedded time stamps, e.g., program clock references (PCR) 220. The PCRs 220 are located at fixed locations within a TSP 210. The timing information can be acquired, for example, from a program clock 1 103 during encoding, see FIG. 1. The program clock 1 preferably operates at a clock rate of 27 Megahertz (MHz). According to the MPEG standard, each PCR 220 is encoded as a thirty-three bit PCR base, and a nine bit PCR extension. The total forty-two bits of the PCR base and extension, in combination, encode the relative time of the program as expressed with reference to the program clock 1 103. In order to maintain an accurate program time, the time stamp PCRs are inserted into the transport stream packets at intervals not to exceed 100 milliseconds.

In a preferred embodiment, programs are encoded by the video server 400 prior to transport. The encoded transport streams are stored the memory of the server 400.

During delivery of a selected transport stream, a program clock 2 104 is used to control the rate of transport. Any differences in the clocking rates of the clocks 103–104 will result in program wander. The tolerances of the clocks 103–104 are specified so that wander is minimized, and the quality of the program is not degraded.

If the transport stream 200 is going to be transported over the circuit 131 using an ATM protocol, the TSP's 200 are formatted into ATM cells 240. By definition, each cell 240 is fifty-three bytes. Since five bytes of the cells 240 are used for header information, e.g., address and header-error-check, up to forty-eight bytes are available for TSP 210 payload. For the purpose of formatting TSPs 210 into cells 240, two types of PDUs are defined. By convention, an eight cell PDU 250 can carry two TSPs, and a five cell PDU 251 can carry one TS packet. Having both eight and five cell PDUs maximizes bandwidth utilization and provides a minimal amount of jitter.

Figure 3:
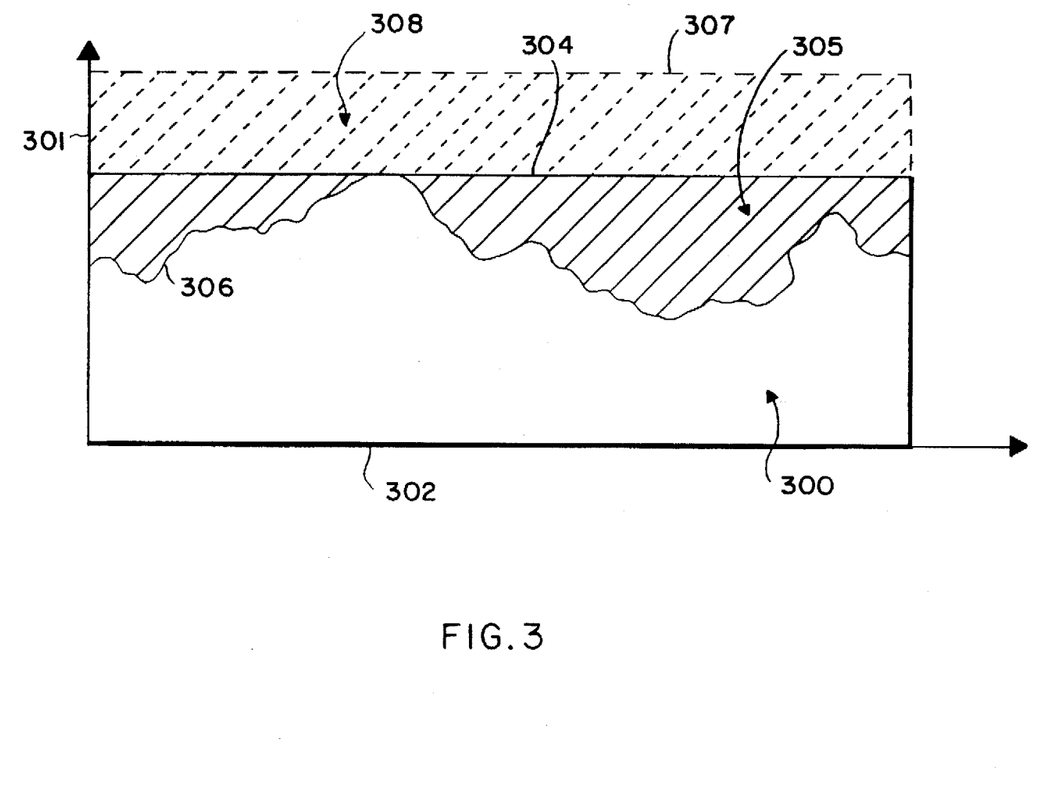
FIG. 3 is timing chart showing variable and constant bit rates.

FIG. 3 diagrammatically shows, not to scale, the relative bandwidth requirements of a portion 300 of the encoded transport stream 200 of FIG. 2. The vertical axis 301 indicates rates (bits/sec), and the horizontal axis 302 indicates time increasing from left to right. The line 306 represents the variable bit rate (VBR) encodings over time of the transport stream 200 due to variations in MPEG compression efficiencies. The area 305 indicates the amount of padding that would traditionally be used to attain a minimum constant bit rate (CBR) transport stream, for example, a stream which can be delivered over a network having bandwidth of 8 Megabits per second (Mbps), e.g., line 304.

Typically, padding increases the size of the VBR transport stream 306 by 10% to 30% to achieve the minimum level 304 of the CBR transport stream. It should be noted that the CBR ATM circuit 133, or virtual channel, requires a minimum transport bandwidth, e.g., a peak and sustained rate, at least as great as the CBR 304.

As an advantage of the invention, proposed is a method and apparatus to utilize instantaneous differences between the VBR and CBR, e.g., area 305, to transport secondary content while preserving the relative time relationship of the timed content 300.

In an alternative embodiment of the invention, it is possible to increase the CBR to a higher rate 307, for example 10 Mbps. This allows additional secondary content to be transported without impacting the delivery of the primary content. Here, the expanded area 308 under line 307 is used to accommodate the additional secondary content.

With the invention, it is also possible to pre-store and transport "true" VBR encoded data. Here, storage requirements and bus activity of the video server can be reduced by as much as 50%.

Figure 4:
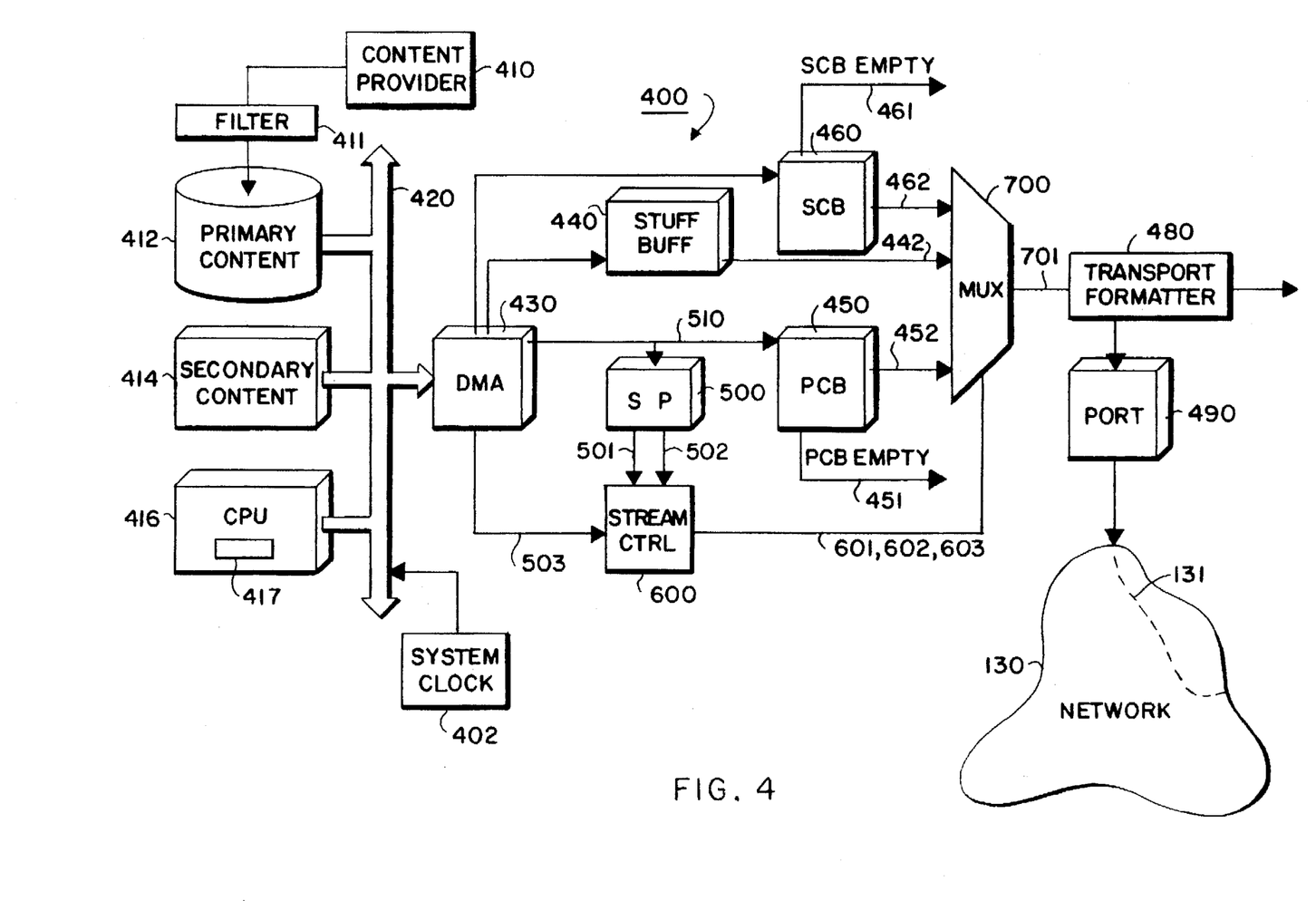
FIG. 4 is a top-level block diagram of the video server of FIG. 1 according to a preferred embodiment of the invention.

In a top-level view, FIG. 4 shows a preferred embodiment of the video server 400. It should be noted, that described is the transport of programs using a single channel or circuit 131 of the network 130. It should be understood, that the structures and processes detailed herein can be duplicated to permit the concurrent transport of multiple transport streams over multiple circuits to multiple customers over the same ports.

The server 400 can include a storage device 412 for storing encoded primary timed program content. The storage device 412 can be disk or tape made of magnetic or optical media. Typically, the content 101 is obtained from a content provider 410. A standard prior art CBR encoded MPEG transport stream includes packets filled with padding bits. These packets will be named padding packets. The padding packets compensate for differences in compression efficiencies for various portions of the program, as described above.

In accordance with one aspect of the invention, a filter 411 removes the padding packets. Removing the padding packets reduces the storage requirements of the storage device 412. The removal of padding packets also results in a substantial reduction of bus activity of the bus 420 of the server 400.

A content generator 414 can create secondary program content such as video text, static images, and other private data stored as files, or databases. The generator 414 can be in the form of a software graphics application. The server 400 also includes at least one central processing unit (CPU) 416. The CPU 416 can include dynamic random access memory (DRAM) 417. The CPU 416 can be used to control the operations of the server 400, and to execute the generator application. The DRAM 417 can be used to store the secondary content. Alternatively, the generator 414 can be one or more dedicated processors similar to CPU 416.

The storage device 412, generator 414, and CPU 416 are connected by a high speed bus 420 to a direct memory access (DMA) device 430. For example, the bus 420 is an industry standard PCI bus. Clocking signals for synchronizing the activities of the server 400 can be provided by the system clock 402.

The DMA device 430 can operate in several modes. In a first mode, the DMA device 430 obtains primary timed program content directly from the storage device 412. In a second mode, the DMA device 430 obtains secondary content from the generator 414. In a third mode, the DMA function is disabled. When the DMA function is disabled, control messages used to operate and program the components of the server 400 can be obtained from the CPU 416 via the bus 420.

In the first mode, the DMA device 430 acquires primary timed content from the storage device 412. The primary content is loaded in a primary content buffer (PCB) 450. A secondary content buffer (SCB) 460 can be loaded with secondary untimed content from the generator 414. The PCB 450 and SCB 460 can operate as first-in-first-out buffers. The third mode can be used to load configuration registers, or to read status information. In addition, while operating in the third mode, the DMA device 430 can do a one time load of a stuff buffer 440 with padding content. The outputs of the PCB 450, SCB 460, and the stuff buffer 440 are coupled to an interleaving multiplexor 700.

As an advantage of the invention, the server 400 includes means for periodically measuring a difference between the number of bits transported in the variable bit rate stream, e.g., the content being loaded into the PCB 450, and the number of bits required to maintain a constant bit rate on the circuit 131.

Therefore, while the PCB 450 is loaded with primary content, bytes of the primary content are counted, and the time stamps, e.g., PCRs 220 of FIG. 2, are extracted. The PCRs 220 byte count values are passed to a stream processor (SP) 500. A stream controller 600 receives the extracted timing information. The stream controller 600 is used to control the interleaving multiplexor 700 with select lines 601, 602 and 603 to achieve a constant bit rate transport stream. Output from the multiplexor 700 is passed to a transport formatter 480 where data are prepared for communication. The prepared data are passed to a port 490 where the data can be presented to the network 130 as, for example, ATM cells.

Figure 5:
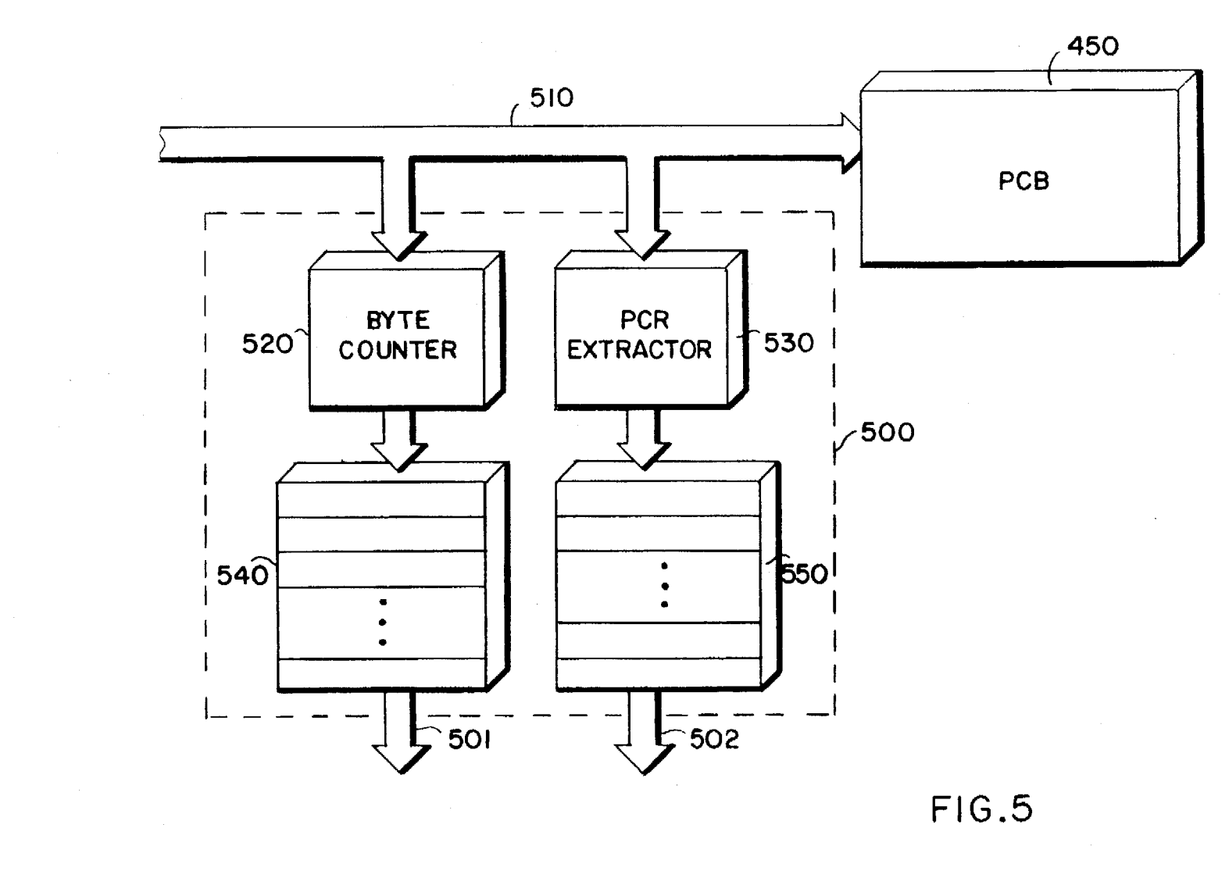
FIG. 5 is a block diagram of a stream processor of the server.

FIG. 5 shows the preferred structure of timing stream processor (SP) 500 in greater detail. Primary variable bit rate content is presented to the SP 500 via bus 510. The SP 500 includes a byte counter 520 and PCR extractor 530. The output of the byte counter 510 is coupled to a first-in-first-out (FIFO) byte count queue 540. The output of the PCR extractor 530 is coupled to the FIFO PCR queue 550. The output of the queues 540 and 550 are respectively signalled on lines 501 and 502.

The size of the entries in the byte FIFO queue 540 can be eighteen bits. The size of the entries in the PCR FIFO queue 550 can be forty-three bits. The number of entries need only be large enough to handle delays between input and output processing of the data stored in the PCB 450, for example, one thousand.

During operation of the SP 500, the byte counter 520 examines the transport stream packets while the PCB 450 is loaded via line 510. Periodically, for each next PCR 200 detected, the total number of bytes that were counted since a last PCR was detected are stored in the FIFO byte count queue 550. Concurrently, the PCR extractor 530 extracts the 42 bit PCR values, as described above, and successively stores the PCR values in the PCR FIFO queue 550. Therefore, for each PCR of the primary variable bit rate content, one entry is created in each of the queues 540 and 550.

It should be noted that any PCR values associated with discontinuity fields, as described above, are separately noted. For example, one bit of each entry in the PCR FIFO queue 550 can be reserved to note a PCR as being discontinuous.

Figure 6:
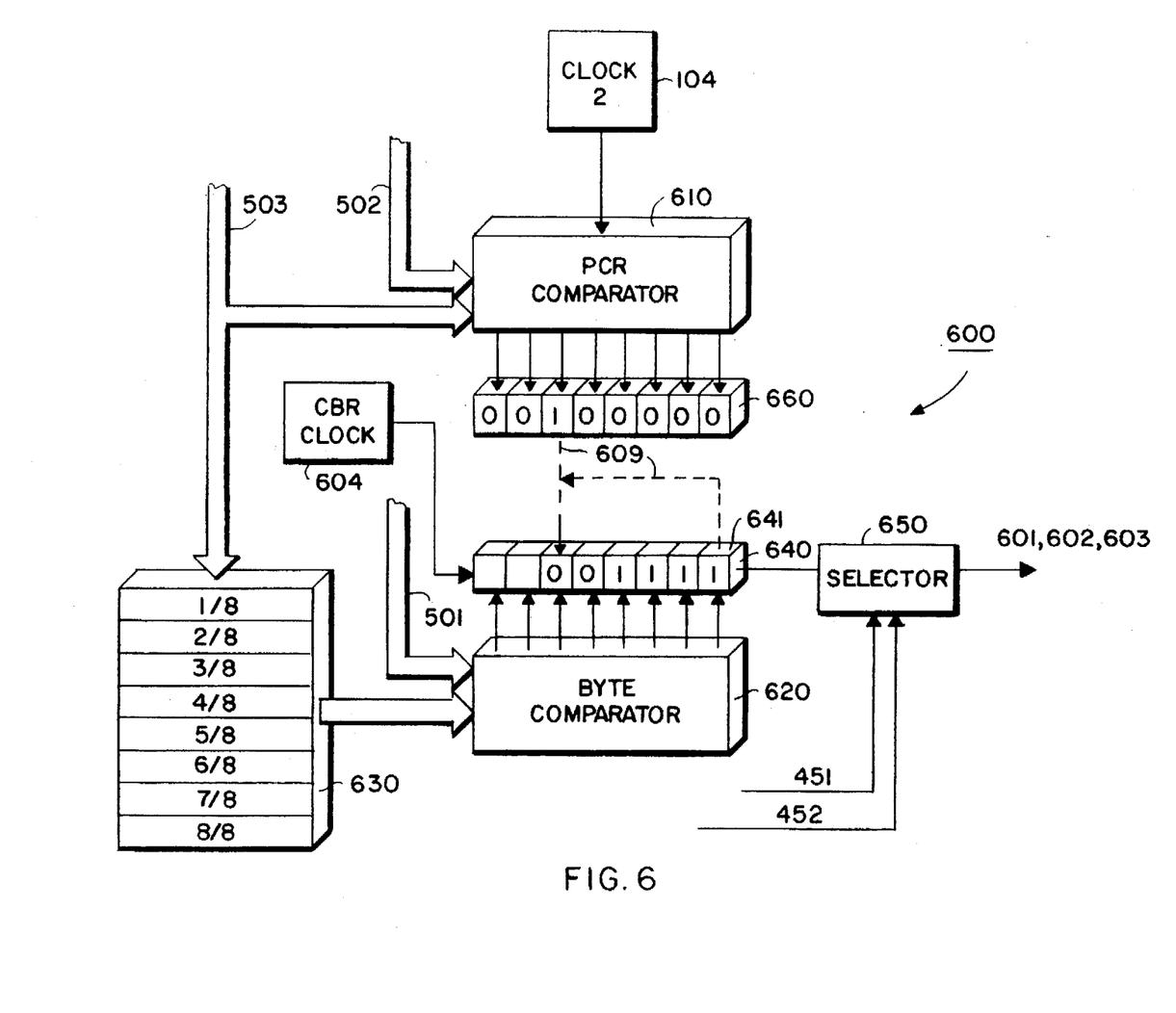
FIG. 6 is a block diagram of a stream controller of the server.

Now with reference to FIG. 6, the structure of the stream controller 600 is described. The stream controller 600 includes a PCR comparator 610 and a byte comparator 620. The output of the PCR comparator 610 is coupled to a delta PCR interval register 660. A circular shift register 640 receives the results of the byte comparator 620. The PCR interval register 660 and the circular shift register are coupled to each other by lines 609.

During operation of the controller 600, the comparators 610 and 620 respectively receive the outputs from the FIFO queues 540 and 550 on lines 501 and 502, e.g., accumulated byte counts and PCR values. In addition, the PCR comparator 610 accepts signals from the program clock 2 104. The rotation of the bits of the circular shift register is synchronized to the signals of a CBR clock 604. The CBR clock is programmed to reflect the minimum CBR 304.

Threshold values used by the byte comparator 620 during operation, as described below, can be pre-loaded via bus 503 operating in the third mode. The output of the shift register 640, e.g., the low order, or right-most bit 641, is coupled to a selector 650. The threshold values used by the PCR comparator are intrinsically known. For eight bit bytes, each threshold value is an increment of 12.5 milliseconds.

In general, the stream controller 600 periodically, e.g., for each PCR detected, measures the difference between the actual number of bits transported in the variable bit rate stream and the number of bits required to maintain the desired constant bit rate on the circuit 131.

The number of bits required to maintain a constant bit rate stream can be determined from the PCR values, and the CBR rate 304 as maintained, for example, by the CBR clock 604. The measured difference is used to selectively interleave content from the buffers 440, 450, and 460 while the program is being transported to customer premises equipment 122 of FIG. 1. The interleaving can supply, if necessary additional secondary content from the SCB 460 to minimize the measured difference. If either the PCB 440 or SCB 450 are empty, as indicated on lines 451, 461 of FIG. 4, then extra content can be supplied from the stuffing buffer 440 to maintain the constant bit rate. As an advantage of the invention, the primary and secondary content are linearly interleaved. This means, that primary and secondary content are evenly distributed over the inter-PCR intervals.

During operation of the controller 600, beginning with a first PCR detected, the PCR comparator 610 compares each extracted 42 bit PCR value with the previously extracted PCR value, unless the PCR value is marked as "discontinuous", in which case the time base is reset. The difference between successive PCR values is expressed as a function of the Program clock 2 104 cycles (e.g., 27 Mhz cycles). This determines the actual time interval between successive PCR values, i.e., a delta PCR time interval. The output of the PCR comparator 610 expresses the delta PCR time intervals in terms of ⅛ fractions of 100 ms, e.g, internal time threshold values. A particular one of the time threshold values is latched in a corresponding bit of the PCR interval register 660. The example of FIG. 6 shows that the current PCR occurred ⅝ of 100 ms, after truncation, since the previous PCR, therefore, the sixth bit of the PCR register 660 is set to a logical one.

At any one time, only one of the bits of the delta PCR interval register 660 is set to a logical one; all other bits are set to a logical zero. By definition, the maximum delta PCR time interval is 100 ms, therefore, if there are eight internal time threshold values possible, each internal time threshold has an additive value of 12.5 ms. The result of the comparison is truncated (rounded-down) to ensure that data bits are linearly distributed during the inter-PCR interval.

If finer granularity of processing is desired, the number of internal time threshold values can be increased, for example, to 16 to indicate 6.25 ms additive time interval values, e.g., 1/16 of the maximum 100 ms inter-PCR interval.

The CBR clock 604 is used to indicate a desired transport rate for the primary and secondary portions of the transport stream, for example, the rate 304 of FIG. 3. Alternatively, the CBR clock 604 can be programmed to indicate the expanded CBR 307 to provide for additional secondary content. If the CBR rate is expanded, then the threshold values are increased correspondingly so that the secondary content remains linearly distributed in the transport stream. The signals of the CBR clock 604 are used to constantly circulate a shift register 640.

A set of transport byte rate threshold registers 630 are pre-loaded with a CBR clock byte rate threshold counts by the CPU 416 via line 503. The byte rate threshold counts indicate the number of bytes to be transported during the operative additive time intervals (12.5) of the PCR comparator 660. The number of transport byte rate threshold registers 630 is equal to the number of bit positions in the PCR interval register 660, e.g., eight.

The loaded byte counts, e.g., the entries labeled "⅛," "⅞," etc., are the number of bytes that can be transported in ⅛ portions of a 100 ms PCR interval at the CBR rate 604. For example, if the CBR clock 604 is signalling at a rate of 1 Megabytes per second (MBps), the ⅛ register is loaded with a ⅛th threshold value count, e.g., 0.0125 MB, and the ⅞th register is loaded with the ⅞ value count, e.g., 0.1 MB. The number of bits required to express each of the transport byte rate threshold registers 630 is determined by the maximum size of the PCB 450. For example, if the PCB 450 can store 256 KB, then 18 bits are necessary for each of the registers 630.

The delta PCR interval register 660 and the circular shift register 640 are coupled so that the bits of the shift register 640 circulate up to the same relative position as the currently set bit of the delta PCR interval register 660, e.g., as indicated by dashed lines 609. During operation of the stream controller 600, the PCR comparator 610 and the byte comparator 620 operate in parallel. Comparison results are latched into interval register 660 for each detected PCR 200. The bits of the shift register results 640 are continuously circulated at the rate indicated by the CBR clock 604.

The byte comparator 620 compares the 18 bit count value 540 with a corresponding transport byte rate threshold value of the registers 630 once for each PCR interval. The result determines the value of the circular shift register 640 bit value. For example, if the byte count, after rounding up, corresponds to the value of the ⅘ in 100 ms entry, then four bits can be set in the circular shift register 640 as shown, e.g., "00001111," one bit for each ⅛ step. The result is rounded up to assure that the data are linearly distributed over the inter-PCR interval.

The PCR interval register 660 defines the total required constant bit rate, "10000" as shown above. The byte comparator 620 measures the difference between actual number of bytes being transported, and the required bit rate. This difference is expressed in the value, e.g., "001111" of the circular shift register 640 as shown in FIG. 6.

As an advantage of the invention, the bits, zeroes and ones, continuously express the relative rate at which primary content and secondary content should be interleaved to achieve the constant bit rate as indicated by the clock 604. The relative rate is periodically adjusted for each PCR detected. With the example values as shown, two bytes of secondary content needs to be supplied for each four bytes of primary content to maintain the constant bit rate 604.

For example, the output of the circular shift register 640 operates the selector 650. The selector 650 also receives signals indicating if any of the buffers 450 and 460 are empty on lines 451 and 461. The selector 650 selects the PCB 450 if bit 641 is a one, unless the PCB is empty in which case the stuff buffer 440 is selected. The selector 650 selects the SCB 460 if bit 641 is a zero, unless the SCB is empty, in which case the stuff buffer 440 is selected.

As an advantage of this invention, the CBR clock 604 and the threshold values can be increased to correspond to a higher constant bit rates, for example, the rate as indicated by line 307 of FIG. 3. This allows for the transport of additional secondary contents, including perhaps higher thresholds rates values are loaded in rate threshold comparison registers 630, and the increased CBR clock rate 604 provides the balance to preserve the relative "real" time relationship of the primary "timed" signals and interleaved secondary expanded data. This assumes that the network and customer premises equipment are able to accommodate the expanded CBR rate 307.

Figure 7:
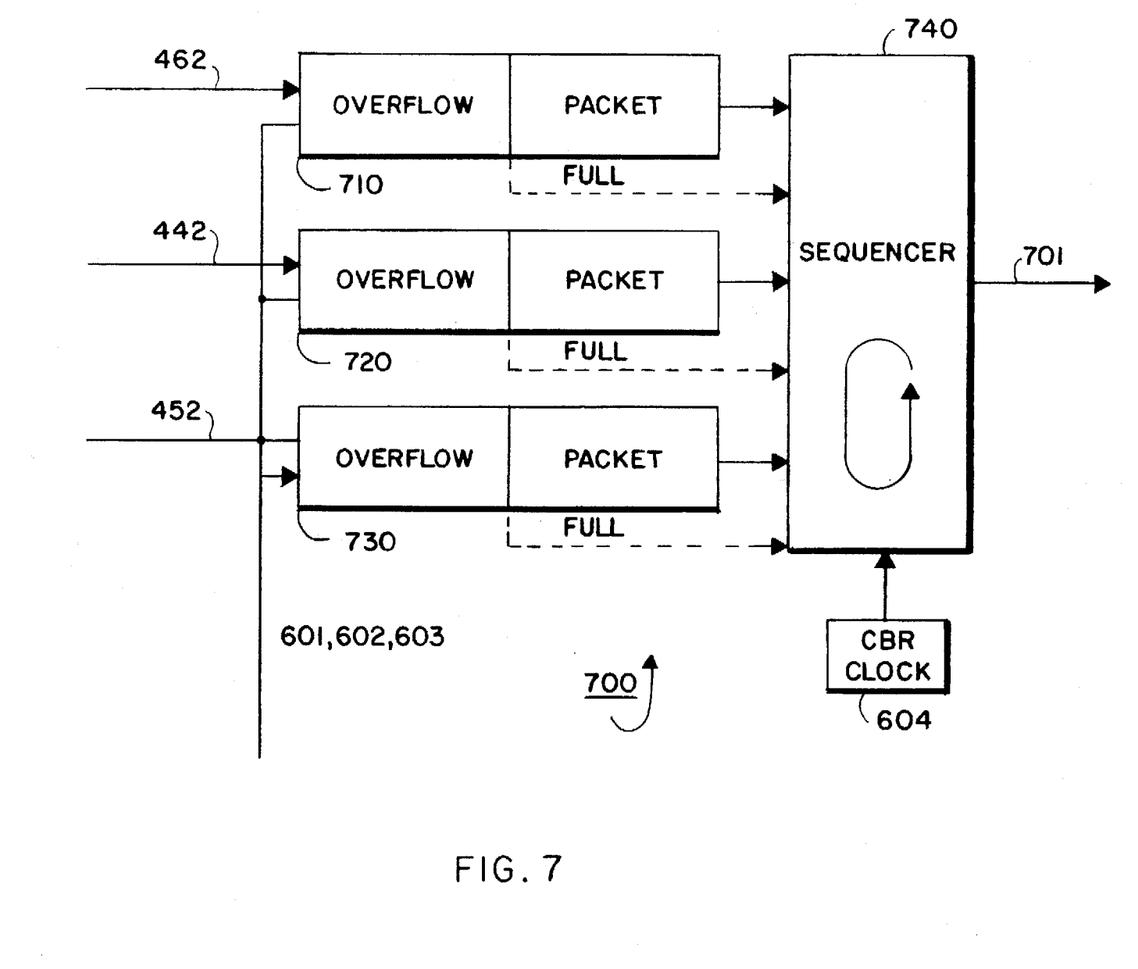
FIGS. 7 is a block diagram of an interleaving multiplexor of the server of FIG. 4.

FIG. 7 shows the structure of the interleaving multiplexor 700 in greater detail. The multiplexor 700 includes three packet buffers 710, 720, 730. Each of the buffers 710, 720, and 730 includes an overflow section, and a packet section. The buffers 710, 720, and 730 respectively receive input from the buffers 460, 440, and 450 via lines 462, 442, and 452. Output from the buffers 710, 720, and 730, e.g., transport packets, is presented to a packet sequencer 740.

During operation of the interleaving multiplexor 700, content stored in the buffers 710, 720, and 730 are segmented into packets, and packets are organized into one or two packet PDUs 250, 251 as required. When one of the buffers becomes full, the sequencer 740 transfers the packet to the transport formatter 480. The overflow sections can hold packets being assembled while the sequencer 740 is busy transferring data out of another buffer. Thus, primary, secondary, and stuffing packets can be evenly or linearly distributed in the resultant interleaved transport stream.

The transport formatter 480 segments PDUs into, for example, ATM cells 240, and presents the cells at the required rate to the network 130 via the port 490 of FIG. 4. It should be noted that the cell rate must be at least as great as the maximum combined primary and secondary rates. The transport rate of the cells is synchronized to signals of the network clock 133. If any timing discrepancies exist, an idle cell can be inserted. The idle cell compensates for discrepancies between various clocking signals.

The processing of the video server according to the invention has several advantages. First, pre-filtering the padding from primary content reduces the amount of storage and server bus bandwidth required to store and prepare transport streams. Second, variable bit rate timed content can be transported while preserving timing relationships. Third, secondary content can be interleaved with primary content to maximize the use of available constant bit rate bandwidth.

To simplify the description of a preferred embodiment of the invention, the video server 400 has been described with respect to transporting a single video stream over a single circuit. It should be apparent to those skilled in the art that server components, such as the buffers, registers, and comparators can be duplicated to concurrently transport multiple streams over multiple circuits.

In addition, the interleaving according to the invention has been described with respect to a primary stream including timed content, and a secondary stream including untimed content. It should be understood that the mix of the composite transport stream can include additional timed or untimed content as long as an available constant bit rate of the network is not exceeded.

Although a preferred embodiment of the invention has been shown and described, it will be readily apparent to those skilled in the art that various modifications may be made therein without departing from the spirit of the invention or the scope of the appended claims.

We claim:

1. A computer implemented method for generating a transport stream to be transported over a circuit of a network signalling at a constant bit rate, comprising:

encoding timed content of a program as a variable bit rate stream;

transporting the variable bit rate stream over a constant bit rate circuit of a network; and while transporting the variable bit rate stream, periodically measuring an accumulated difference between the number of bits transported in the variable bit rate stream and the number of bits required for the constant bit rate circuit; and supplying secondary untimed content to the constant bit rate circuit at a rate which minimizes the accumulated difference.

2. The method of claim 1 further comprising:

linearly distributing the secondary untimed content over the variable bit rate stream during any periodically measured interval.

3. The method of claim 1 wherein the signaling rate of the constant bit rate circuit is minimized to transport any portion of the variable bit rate stream.

4. The method of claim 1 wherein the signaling rate of the constant bit rate circuit is substantially greater than the signaling rate of any portion of the variable bit rate stream to transport additional secondary content for any portion of the variable bit rate stream.

5. The method of claim 1 wherein the supplying of secondary content is disabled to allow for the transport of the variable bit rate stream circuit.

6. The method of claim 1 wherein the variable bit rate stream includes time stamps, and where the periodic measuring is done for each detected time stamp.

7. The method of claim 2 further including a circular shift register, and further comprising:

storing a bit pattern in the circular shift register indicating the relative selection of the timed and untimed content, and circulating the bit pattern in the circular shift at the constant bit rate.

8. The method of claim 2 further comprising:

rounding-up the accumulated number of bits to be transported in the variable bit rate stream and rounding-down the number of bit periods required for the constant bit rate circuit to linearly distribute the secondary untimed content over the variable bit rate stream during any periodically measured interval.

9. The method of claim 8 further comprising comparing the accumulated difference between the number of bits transported in the variable bit rate stream to a first set of threshold values, and comparing the number of bits required for the constant bit rate circuit to a second set of threshold values, the first set of threshold values being for fractional time periods of a maximum time period between successive measurements, the second set of threshold being for corresponding number of bytes required for the fractional time periods.

10. An apparatus for generating a transport stream to be transported over a circuit of a network signalling at a constant bit rate, comprising:

means for encoding timed content of a program as a variable bit rate stream;

means for transporting the variable bit rate stream over a constant bit rate circuit of a network;

means for periodically measuring an accumulated difference between the number of bits transported in the variable bit rate stream and the number of bits required for the constant bit rate circuit while transporting the variable bit rate stream;

means for supplying secondary untimed content to the constant bit rate circuit at a rate which minimizes the accumulated difference.

11. The apparatus of claim 10 further comprising:

means for linearly distributing the secondary untimed content over the variable bit rate stream during any periodically measured interval.

12. The apparatus of claim 10 wherein the variable bit rate stream includes periodic time stamps, and where the means for measuring detects each periodic time stamp.

13. The apparatus of claim 11 further comprising:

a circular shift register, the circular shift register for storing a bit pattern to indicate a relative selection of the timed and untimed content, and means for circulating the bit pattern in the circular shift at the constant bit rate.

* * * * *